United States Patent
Carney

[11] Patent Number: 6,137,405
[45] Date of Patent: Oct. 24, 2000

[54] REMOTELY CONTROLLED INTRUSION ALARM AND DETECTION SYSTEM

[76] Inventor: William P. Carney, 4 High Ridge La., Oyster Bay, N.Y. 11771

[21] Appl. No.: 09/372,836

[22] Filed: Aug. 12, 1999

[51] Int. Cl.[7] ................................................. G08B 13/00
[52] U.S. Cl. ........................... 340/541; 340/543; 340/545
[58] Field of Search ............................... 340/539, 825.69, 340/541, 542, 543, 544, 545, 835

[56] References Cited

U.S. PATENT DOCUMENTS

| | | | |
|---|---|---|---|
| 3,906,348 | 9/1975 | Willmott | 325/37 |
| 4,383,242 | 5/1983 | Sassover et al. | 340/63 |
| 4,496,942 | 1/1985 | Matsuoka | 340/696 |
| 4,535,333 | 8/1985 | Twardowski | 340/539 |
| 4,602,246 | 7/1986 | Jensen | 340/554 |
| 4,672,365 | 6/1987 | Gehman et al. | 340/539 |
| 4,794,368 | 12/1988 | Grossheim et al. | 340/527 |
| 4,833,449 | 5/1989 | Gaffigan | 340/539 |
| 4,897,630 | 1/1990 | Nykerk | 340/426 |
| 4,912,463 | 3/1990 | Li | 340/825.69 |
| 4,994,787 | 2/1991 | Kratt et al. | 340/539 |
| 5,010,445 | 4/1991 | Weinold | 361/392 |
| 5,379,453 | 1/1995 | Tigwell | 455/151.2 |
| 5,530,431 | 6/1996 | Wingard | 340/568 |
| 5,621,385 | 4/1997 | Carney | 340/541 |
| 5,808,547 | 9/1998 | Carney | 340/541 |
| 5,841,390 | 11/1998 | Tsui | 341/173 |

*Primary Examiner*—Jeffery A. Hofsass
*Assistant Examiner*—Daniel Previl
*Attorney, Agent, or Firm*—Charles E. Temko

[57] ABSTRACT

An intrusion detection system used to surveil a predetermined space includes a self-contained monitor responsive to an authorized remote controller transmitting a particular radio-frequency (RF) carrier signal under the control a user. The self-contained monitor comprises a primary power source electrically coupled to a nonvolatile memory circuit, a receiver circuit and a motion detector positioned to surveil a predetermined space for an intruder. A plurality of switches accessible to the user is included in the self-contained monitor for setting a binary code thereon which represents the particular RF carrier signal. Also included in the self-contained monitor and accessible to the user is a code transfer circuit for transferring the last code set on the code setting switch into the nonvolatile memory circuit making the self-contained monitor responsive to the particular RF carrier signal. The user can change the last code set on the code setting switch without effecting the last code transferred into the nonvolatile memory circuit so that the intruder cannot determine the last code which makes the self-contained monitor responsive to the authorized remote controller.

17 Claims, 3 Drawing Sheets

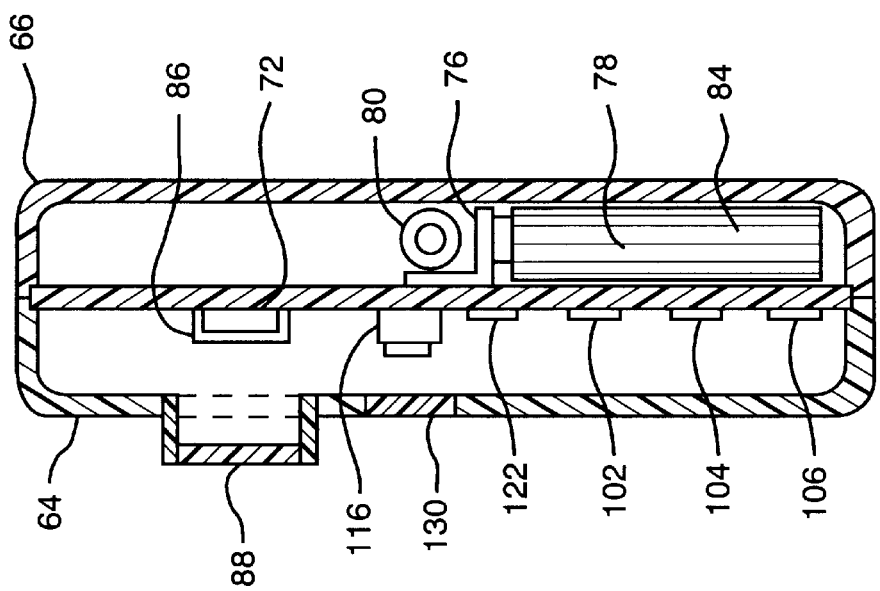
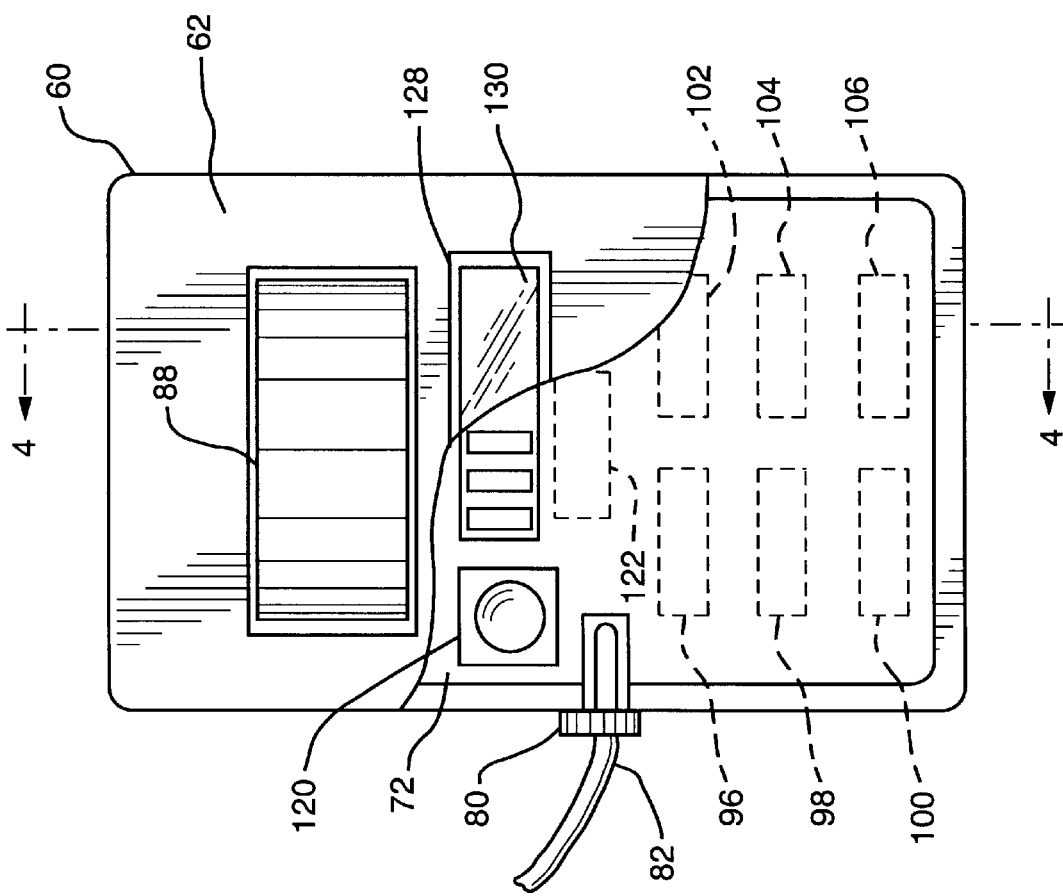

REMOTELY CONTROLLED INTRUSION ALARM AND DETECTION SYSTEM

BACKGROUND OF THE INVENTION

1. Field of the Invention

This invention relates generally to remotely controlled systems employing a transmitter and a receiver and more particularly to a self-contained monitor for surveilling a predetermined space wherein the monitor is responsive to an authorized remote controller transmitting a particular radio-frequency (RF) carrier signal under the control of a user.

2. Description of Related Art

Intrusion detection systems employing remotely controlled self-contained monitors surveilling predetermined spaces are known in the prior art. Such monitors present certain problems because they are often disposed in areas where an intruder may have the time and the privacy to examine the monitor and, unbeknownst to the user, reset the monitor to cause the user to enter the predetermined space unaware that the intruder is in the area waiting to surprise the user.

U.S. Pat. No. 3,906,348, which issued to Colin B. Willmott on Sep. 16, 1975 discloses a digital radio control system comprising a transmitter and receiver wherein a plurality of two position switches may be set in a transmitter to pick a particular code which will be transmitted, and in which a plurality of switches in a receiver may be set to a particular code such that if the same code is selected in the receiver as is set in the transmitter, the receiver will be energized upon receipt of the code. In a typical application of Willmott's radio control system such as a remotely controlled garage door opener, the switches in the receiver are generally accessible to a user who relies on observing the switch settings in order to duplicate them on either a replacement remote controller, if the original is lost or broken, or on additional remote controllers should the user authorize other individuals access to his or her garage. Willmott does not address the problem of a receiver in an intrusion monitor which is controlled by a remote controller and which is used to surveil a predetermined space wherein an intruder can observe the code setting in the monitor and use it to program an unauthorized remote transmitter in order to control the monitor.

U.S. Pat. No. 4,383,242, which issued to Nathan Sassover and William A. Rennie on May 10, 1983 teaches a remotely controlled anti-theft system employed on an automobile which is armed only when a hand held coded transmitter is operated and is disarmed upon a subsequent operation of the transmitter. Sassover ensures the secrecy of the signaling code used to operate the system through the use of a resistor code cartridge installed in the transmitter and a resistor code cartridge installed in a receiver. As disclosed by Sassover, the resistors in his code cartridges are laser-trimmed to 1% accuracy in a factory in order to tune the transmitter to the receiver. Sassover does not teach a simple and inexpensive means by which a user can install and secrete the signaling code in the receiver in order to tune it to the particular carrier signal transmitted by the coded transmitter.

U.S. Pat. No. 4,897,630, a continuation-in-part of U.S. Pat. No. 4,794,368, which issued to Michael Nykerk on Jan. 30, 1990 discloses a computerized alarm system for detecting, signaling and reporting the occurrence of a penetration toward or an unauthorized entry into a defined area, such as an automobile. It also discloses a self-contained monitor intended to protect a variety of objects such as a boat, a trailer, a house, etc. and which communicates with a remote controller in a similar manner as taught in U.S. Pat. No. 4,794,368. Nykerk discloses a multi-button remote controller associated with a multichannel system wherein a user pressing any button once or pressing any combination of the buttons simultaneously controls a number of separate functions. In one embodiment of his disclosure, he teaches that the remote controller may be used as a garage door opener as well as the transmitter for the alarm system. Nykerk's self-contained monitor employs a programming device which plugs into a control module in his monitor. An installer, through the use of a keyboard that forms part of the programming device, inputs certain operating options into the monitor. However, Nykerk does not disclose a self-contained monitor which includes an inexpensive and simple means for a user to set and secrete a code in the monitor to tune it to a carrier signal transmitted by the remote controller.

U.S. Pat. No. 5,808,547, a continuation-in-part of U.S. Pat. No. 5,621,385, which issued to the applicant of the present invention, William P. Carney, on Sep. 15, 1998 discloses an intrusion detection system used to surveil a predetermined space wherein a self-contained monitor may be armed, disarmed and tested by a remote controller transmitting an RF signal initiated by a user manipulating a button switch. The disclosure teaches that the transmitting device operates in a manner similar to a garage door opener but does not teach a self-contained monitor comprising a means, accessible to the user, for setting and secreting a code in the monitor for tuning the monitor to the RF carrier signal transmitted by the remote controller.

As can be seen from the prior art, existing alarm systems which include a self-contained monitor responsive to an authorized remote controller transmitting a particular RF carrier signal under the control of a user do not solve the problem of providing a simple and inexpensive means, accessible to the user, for setting and secreting a code in the monitor such that the code tunes the monitor to the particular RF carrier signal and such that the code setting cannot be determined by an intruder.

SUMMARY OF THE INVENTION

The present invention is directed to a system that solves the problem of providing a simple and cost effective means by which a user can set and secrete a code in a self-contained monitor of an intrusion detection system tuning the monitor to a particular RF carrier signal such that the code cannot be determined by an intruder.

The present invention comprises a self-contained monitor energized by a primary power source responsive to an authorized remote controller transmitting a particular RF carrier signal under the control of a user. The self-contained monitor includes a memory circuit used to store a code therein electrically coupled to an RF receiver circuit and a motion detector positioned to surveil a predetermined space for an intruder. A plurality of switches is included in the self-contained monitor and is electrically coupled to the memory circuit and which is accessible to the user for setting the code thereon representing the particular RF carrier signal. A code transfer circuit is also included in the self-contained monitor and is electrically coupled to the memory circuit and the plurality of switches and is accessible to the user for transferring the last code set on the plurality of switches into the memory circuit. The last code transferred into the memory circuit makes the RF receiver circuit responsive to the particular RF carrier signal.

In another aspect of the invention, a receiver for use in a remotely controlled system comprises an RF receiver circuit responsive to an authorized remote controller transmitting a particular RF carrier signal under the control of a user. The RF receiver circuit is energized by a primary power source and is electrically coupled to a nonvolatile memory circuit. A digital switch is included in the receiver and is electrically coupled to the nonvolatile memory circuit and is accessible to the user for setting a binary code thereon representing the particular RF carrier signal. A code transfer circuit is included in the receiver and is electrically coupled to the nonvolatile memory circuit and the digital switch and is accessible to the user for transferring the last binary code set on the digital switch into the nonvolatile memory circuit. The last binary code secured in the nonvolatile memory circuit makes the RF receiver circuit responsive to the particular RF carrier signal.

BRIEF DESCRIPTION OF THE DRAWINGS

FIG. 3 is a front elevation view of the self-contained monitor of the present invention.

FIG. 4 is a sectional view taken along the line 4—4 in FIG. 3.

DETAILED DESCRIPTION OF THE PREFERRED EMBODIMENT

Figure 1:
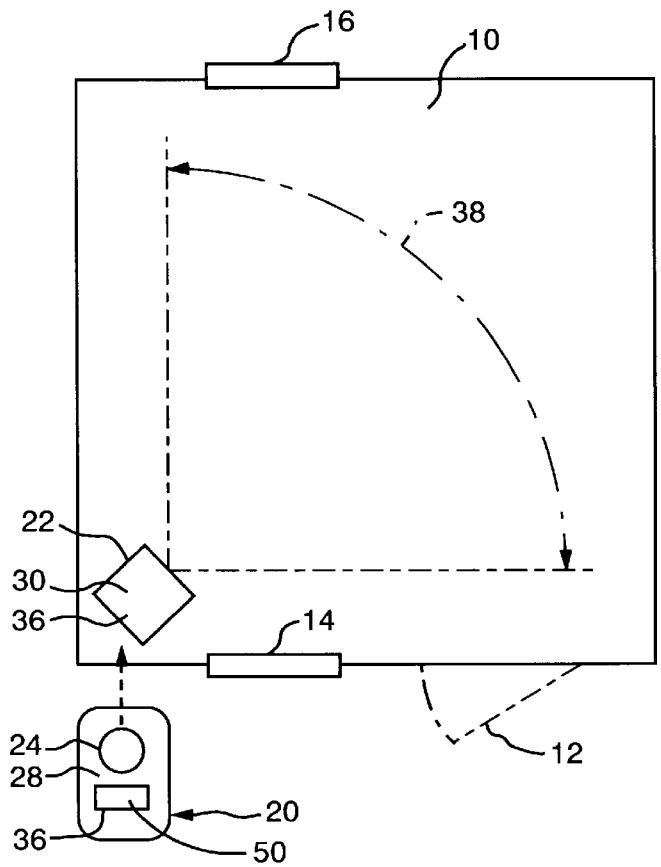
FIG. 1 is a plan view of a prior art intrusion detection system disposed to surveil a premises. Also included in this figure is a prior art remote controller.
Figure 2:
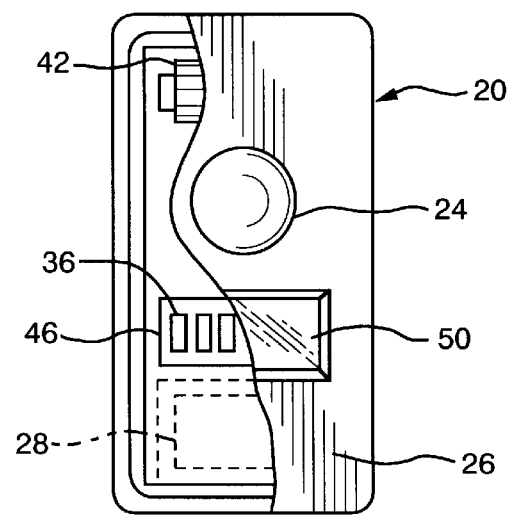
FIG. 2 is a more detailed illustration of the prior art remote controller shown in FIG. 1.

Referring now to the drawings, FIGS. 1 and 2 show a prior art intrusion detection system used to monitor a typical predetermined space 10 for an intruder. The space 10 includes a door 12 and may or may not include additional openings such as a front window 14 and a rear window 16 depending on the particular premises in which the system is deployed. The system comprises an authorized remote controller generally referred to by reference number 20 and a monitor 22. The remote controller 20 may be hand held and includes a button switch 24 and a transmitter circuit 28 which remotely controls the monitor 22 by transmitting a particular radio-frequency (RF) carrier signal to a receiver circuit 30 in the monitor 22. The monitor 22 is disposed within the predetermined space 10 and can be armed, disarmed, and tested by the particular RF carrier signal received from the remote controller 20 initiated by an authorized user manipulating the button switch 24. When armed, the monitor 22 produces an alarm response if the predetermined space 10 is intruded in order to frighten away the intruder. In addition, the monitor 22 records and may be tested by the remote controller 20 for the intrusion so that a returning occupant does not reenter the predetermined space 10, thus avoiding the risk of confronting the intruder.

The transmitter circuit 28 and the receiver circuit 30 shown in FIGS. 1 and 2 operate in a manner similar to the manner in which transmitter and receiver circuits operate in remotely controlled garage door systems having a typical button switch remote which causes a particular RF carrier signal to be transmitted to a receiver to either open or close a garage door. So that interference with other systems in the vicinity does not occur, garage door transmitters are generally tuned to associated receivers by a plurality of two position switches 36 included therein. Accessible to the user, the plurality of two position switches 36 is set, as described below, to program a particular binary code in the remote controller 20 and the monitor 22 thereby making the receiver circuit 30 responsive to the particular RF carrier signal.

The plurality of two position switches 36 commonly used in garage door systems is known in the art as a digital switch and is often referred to as either a Dual In-Line Package (DIP) switch or a Single In-Line Package (SIP) switch depending on the construction thereof Typically, DIP or SIP type switches comprise a plurality of miniature on-off switches positioned adjacent each other in a small switch housing designed to be mounted on a printed circuit board (PCB) whereon each switch can be set in either an on position or an off position corresponding to the zeroes and ones, respectively, of a binary code. Since the particular RF carrier signal is usually transmitted in binary code format, the digital switch is an optimum means by which to set such a code. Further, digital switches are designed to enable the users of remote control systems to observe the binary code set thereon and either employ the same code or select and set another code to tune transmitters to associated receivers. Additionally, digital switches are a cost effective tuning means when compared to, for example, alternative methods which require the costly factory coding and serial numbering of each system to provide users a means by which to purchase factory coded spare transmitters tuned to previously purchased factory coded receivers.

However, it is important to note that being able to observe the code setting on any switch presents a problem when it is employed in the prior art monitor 22 disposed in a space or premises such as shown in FIG. 1 wherein the intruder has the privacy and the time to mute the alarm and examine the monitor 22 to observe the code setting contained therein. Once the code setting is determined, the intruder can set the same code on an unauthorized remote controller which he or she has brought along in order to rearm the monitor 22 and remain undetected in the predetermined space 10 outside a detection pattern 38 of the monitor 22. When the user returns and remotely tests the monitor 22 for the occurrence of an intrusion, he or she receives a response from the rearmed monitor 22 falsely indicating that an intrusion has not occurred and therefore enters the predetermined space 10 unaware an intrusion has in fact taken place and unaware the intruder may remain therein. The present invention solves this problem and, as will be described in more detail below, employs a coding arrangement wherein an improved self-contained monitor 60 (FIG. 3) is coded using a digital type switch such that after the code is set in the self-contained monitor 60 it cannot be determined by the intruder.

FIG. 2 illustrates, in more detail, the remote controller 20 shown in FIG. 1 including a remote controller housing 26, shown partially fragmented, a battery power supply 42, the button switch 24, the transmitter circuit 28 and a controller digital switch 46 comprising the plurality of two position switches 36, described in detail above, which is set to a binary code to determine the particular RF carrier signal transmitted by the transmitter circuit 28 when the user depresses the button switch 24. The controller digital switch 46 is generally accessed by removing a snap-in cover 50. As disclosed in the prior art, the user may manipulate the button switch 24 to create a select code signal to direct the monitor 22 to perform specific functions such as either the arming, disarming or testing of the monitor 22 . In this signaling arrangement, the select code signal is electronically superimposed on the particular RF carrier signal in order to prompt a specific response from the monitor 22. Typically, the authorized remote controller 20 remains in the possession of the authorized user and the setting on the controller digital switch 46 is not accessible to the intruder.

FIGS. 3 and 4 illustrate the improved self-contained monitor 60 which includes a housing 62 having a front section 64, pictured partially fragmented, and a rear section 66 each molded from plastic resin and shaped to accommodate the components of the self-contained monitor 60. A PCB 72 mounts certain of the electrical components thereon and a primary power source 76 comprising a battery pack 78 and/or a power jack 80 for an A.C. adaptor cord 82, a short length of which is shown in FIG. 4, electrically couples a D.C. potential to the electrical components. When both the battery pack 78 and the A.C. adaptor cord 82 are used, the power supplied by the A.C. adaptor cord 82 may be employed to not only energize the electrical components of the self-contained monitor 60 but also charge batteries 84 contained therein. A known Passive Infrared (PIR) detector 86 or an equivalent motion sensing device is mounted on the PCB 72 adjacent an arcuate fresnel lens 88 affixed to the front section 64. The fresnel lens 88 is well known in the art as a means by which to focus infrared energy on the PIR detector 86 in order to sense an intruder entering the detection pattern 38 of the self-contained monitor 60 which may be aimed to cover the predetermined space 10 as shown in FIG. 1 as well as other areas such as closets, basements and the like that the authorized user wishes to surveil.

Also mounted on the PCB 72, electrically coupled to the PIR detector 86 and the primary power source 76, are an RF receiver circuit 96, a volatile memory circuit 98, a nonvolatile memory circuit 100, a logic circuit 102, and a responder 104. For the sake of clarity, each of the aforementioned components is shown diagrammatically in FIG. 3 as defining certain areas on the PCB 72 bounded by dashed lines pictured thereon. As previously mentioned, the RF receiver circuit 96 is the type commonly used with garage door openers and is employed in the self-contained monitor 60 to receive the particular RF carrier signal transmitted by the remote controller 20 (FIG. 1) which directs the self-contained monitor 60 to perform certain functions. For example, the volatile memory circuit 98 has an armed state and a disarmed state which is employed to provide the user with a means by which to test for the occurrance of an intruder. When leaving the predetermined space 10 (FIG. 1), the user arms the monitor 60 by manipulating the button switch 24 (FIG. 1) and should an intruder enter therein during the user's absence, the monitor 60 senses the intrusion and switches the volatile memory circuit 98 from the armed state to the disarmed state. Upon returning, the user manipulates the button switch 24 to test the state of the volatile memory circuit 98 and if the system responds in a manner indicating that it has been switched to the disarmed state, the returning occupant is warned not to enter therein in order to avoid the possibility of encountering the remaining intruder.

The present invention includes means for setting and secreting the binary code which represents the particular RF carrier signal in either the volatile memory circuit 98 or the nonvolatile memory circuit 100 such that the intruder cannot determine the binary code. As presented in this disclosure and as is generally accepted in the art, a volatile memory is defined as a device which loses the data stored therein when the primary power source energizing the device is interrupted and, conversely, a nonvolatile memory arrangement does not. For example, the data stored in the volatile memory circuit 98 is lost when the AC adapter cord 82 is unplugged and, if the self-contained monitor 60 includes the battery pack 78, when the batteries 84 are removed. In the present invention, the volatile memory circuit 98 is armed in response to the particular RF carrier signal and is disarmed by either the PIR detector 86 sensing an intrusion or by an interruption of primary power. Since the data stored in the nonvolatile memory circuit 100 is not erased when primary power is interrupted, it is advantageous to store the binary code data representing the particular RF carrier signal in the nonvolatile memory circuit 100 so that the user does not have to reprogram the system after each time primary power is removed therefrom.

There are various types of nonvolatile solid state memory circuit arrangements know in the industry which, once programmed, do not lose the data stored therein unless reprogrammed by the user. One type is known in the art as an Electrically Erasable Programmable Read Only Memory (EEPROM). Another type employs miniature batteries to back-up the primary power to the memory device wherein the batteries are similar to those used to energize the clock display in personal computers and are generally charged by the primary power to the computer. Finally, there are commercially available capacitors which are designed to hold an electrical charge for a long period of time, at least several months, and which are adapted specifically to provide a back-up voltage for a solid state memory making it nonvolatile by providing an uninterrupted voltage thereto should the primary power be disconnected. In their idle state, back-up capacitors are kept charged by the primary power. As described below, it is advantageous that the nonvolatile memory circuit 100 stores the binary code making the self-contained monitor 60 responsive to the remote controller 20 in a manner such that the intruder cannot determine the binary code, thus providing the user with an additional level of security at a minimum cost. In the preferred embodiment, the nonvolatile memory circuit 100 comprises two relatively inexpensive standard four digit integrated circuit flip-flops and a capacitor back-up 106. The flip-flops are available from a number of sources and may be purchased as part number MC140175 from Motorola. The capacitor back-up 106, as previously described, is a commercially available component and may be obtained as a model SG capacitor from Panasonic.

Further, there is mounted on the PCB 72 a monitor digital switch 116 electrically coupled to a code transfer switch 120, a one shot 122 and the nonvolatile memory circuit 100. For the sake of clarity, the one shot 122 is shown in FIG. 3 as defining an area bounded by dashed lines pictured on the PCB 72. The monitor digital switch 116 is similar to the controller digital switch 46 shown in FIG. 2 and is employed by the user to set the same binary code thereon as is set on the controller digital switch 46 in order to tune the RF receiver circuit 96 to the particular RF carrier signal. As previously mentioned, digital type switches are designed to be mounted on printed circuit boards and it is therefore advantageous to mount the monitor digital switch 116 on the PCB 72 adjacent an opening 128 in the front section 64 in which a removable cover 130 is positioned. The user sets the digital code on the monitor digital switch 116 through the opening 128 using a small pointed object such as the tip of a ball point pen or a small screw driver. Mounted adjacent the monitor digital switch 116 is the code transfer switch 120 also accessible to the user through the opening 128. Preferably, the code transfer switch 120 is a miniature single pole single throw PCB mounted momentary pushbutton switch which may be purchased from any one of a number of manufacturers such as Panasonic, part number EVQ-PBC04M. When activated, as described in more detail below, the code transfer switch 120 energizes the one shot 122 causing the last code set on the monitor digital switch 116 prior to energizing the one shot 122 to be transferred into the nonvolatile memory circuit 100. In the preferred embodiment, the one shot 122 is a solid state device, common in the industry, such as a National Semiconductor one shot, catalog number CD4528. The nonvolatile memory circuit 100 is electrically coupled to the RF receiver circuit 96 which is programmed by the code contained in the nonvolatile memory circuit 100 making the RF receiver circuit 96 responsive to the particular RF carrier signal. After transferring the code, the user can change the code setting on the monitor digital switch 116 so that the intruder cannot observe the code and duplicate the same on the unauthorized remote controller in order to rearm a disarmed volatile memory circuit 98 thereby causing the self-contained monitor 60 to produce an erroneous response prompted by the authorized remote controller 20.

For example, during the user's absence, an intruder carrying an unauthorized remote controller may enter the protected premises, such as an apartment, and locate and mute the monitor 60 by removing primary power therefrom while it is sounding an alarm as a result of the intrusion. Once inside, the intruder can gain access to the monitor digital switch 116 and the code transfer switch 120 but cannot determine the binary code which makes the monitor 60 responsive to the authorized remote controller 20 because the user transferred this code into the nonvolatile memory circuit 100 and subsequently changed the setting on the monitor digital switch 116 without effecting the transferred code. The intruder could program a different binary code in the nonvolatile memory circuit 100 making the monitor 60 responsive to the intruder's unauthorized remote controller and rearm the monitor 60 yet not compromise the security of the returning occupant. Even though the monitor is rearmed, it will not respond to the particular RF carrier signal transmitted by the authorized remote controller 20 activated by the returning occupant remotely testing the status of the monitor 60 because the monitor 60 has been tuned by the intruder to respond to an RF signal other than that transmitted by the authorized remote controller 20. Therefore, since the returning occupant cannot prompt a response from the monitor 60, he or she will seek help before entering the apartment. Confronted by the present invention, the intruder is never sure whether the returning occupant, unable to obtain a response from the monitor 60, will return at any time with help. Given this possibility, the intruder will vacate the premises as soon as possible.

Figure 5:
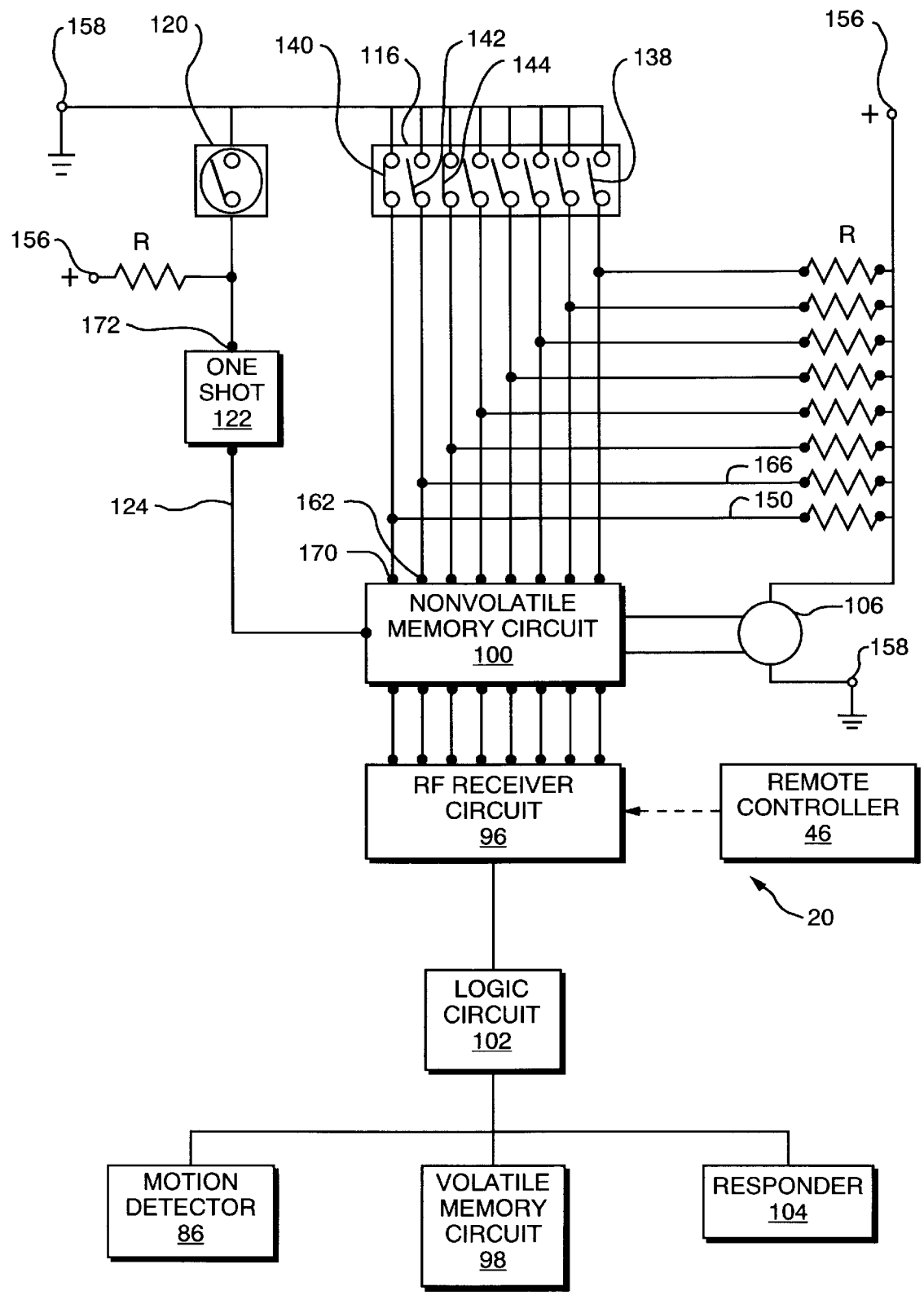
FIG. 5 is a block diagram of the intrusion detection system of the present invention.

FIG. 5 is a block diagram illustrating the manner in which certain of the components pictured in FIGS. 3 and 4 are electrically coupled. In the preferred embodiment, the controller digital switch 116 comprises eight individual on-off switches 138 and, as previously mentioned, each switch may be set manually in either the on or closed position, representing the binary number zero, or the off or open position representing the binary number one. For the sake of illustration, the monitor digital switch 116 in FIG. 5 is set to the binary code 01011111 thus including a first individual switch 140 in the closed position, a second individual switch 142 in the open position, a third 144 closed and so forth, as illustrated in FIG. 5. Each individual switch circuit, such as the first circuit 150 which includes the first switch 140, electrically couples the switch 140 with an associated nonvolatile memory terminal 162, a resistor R, a positive terminal 156 of the primary power source 76 (FIG. 4) and a ground terminal 158 thereof. The first circuit 150 includes a first voltage potential at a first nonvolatile memory terminal 162 and a second circuit 166 includes a second voltage potential at a second nonvolatile memory terminal 170. When the user activates the code transfer switch 120, the one shot 122 in a code transfer circuit 124 causes the first and second voltage potentials to be transferred into the nonvolatile memory circuit 100 as a binary zero and a binary one, respectively. In FIG. 5, activation of the one shot 122 transfers the voltage potential on each of the eight nonvolatile memory terminals into the nonvolatile memory circuit 100 as the binary code 01011111 thereby making the receiver circuit 96 responsive to the particular RF carrier signal represented by this binary code. In the preferred embodiment, the ohmic values of the resistors R are selected such that the voltage potential at the nonvolatile memory terminals associated with open individual switches is substantially equivalent to the positive voltage potential of the primary power supply and the voltage potential at the nonvolatile memory terminals associated with closed individual switches is substantially equal to the ground potential thereof Similarly, the voltage potential in the code transfer circuit 124 at an input terminal 172 of the one shot 122 is substantially equivalent to the positive voltage potential of the primary power supply when the code transfer switch 120 is open and substantially equal to ground potential when it is closed.

The logic circuit 102 is electrically coupled to the RF receiver circuit 96, the motion detector 86, the volatile memory circuit 98 and the responder 104. It monitors the status of the elements to which it is electrically coupled and directs them to respond according to particular system conditions. For example, upon receipt of the particular RF carrier signal to which the RF receiver circuit 96 is tuned, if the volatile memory circuit 98 is not armed, the logic circuit 102 will arm it. Further, if the motion detector 86 senses an intruder and, if the volatile memory circuit 98 is armed, the logic circuit 102 will disarm it. As a final example, if the RF receiver circuit 96 receives the particular RF carrier signal to which it is tuned and, if the volatile memory circuit 98 is armed, the logic circuit 102 will direct the responder 104 to respond indicating that an intrusion has not occurred and it is safe to enter the surveilled space. Also, shown in FIG. 5 is the capacitor back-up 106 electrically coupled to the nonvolatile memory circuit 100 and the positive terminal 156 and the ground terminal 158 of the primary power source 76 (FIG. 4).

Once the code setting representing the particular RF carrier signal has been transferred into the nonvolatile memory circuit 100 and the setting on the monitor digital switch 116 has been changed, the code can neither be determined by an intruder nor erased from memory by a power failure. Should the user wish to tune the system to a different particular RF carrier signal, he or she simply changes the digital switch settings on the controller digital switch 46 and the monitor digital switch 116 to newly selected matched binary code settings and then activates the code transfer switch 120 thereby transferring the code set on the monitor digital switch 116 to the nonvolatile memory circuit 100 which remembers only the last binary code transferred to it. The user can then change the code settings on the monitor digital switch 116 and subsequently test the retuned self-contained monitor 60 by prompting a response therefrom by activating the retuned authorized remote controller 20.

As can be seen from the foregoing disclosure, the structure and methods of the present invention can be used in a variety of secure remotely controlled systems employing receivers that are responsive to particular RF carrier signals transmitted by remote controllers wherein the binary code representing the particular RF carrier signal is set by the user on digital switches in both the transmitter and receiver in order to tune one to the other. The present invention provides a cost effective and reliable means by which to secure the binary code in the receiver thereby preventing unauthorized persons from determining the same.

It is to be understood that the present invention is not limited to the precise details of structure shown and set forth in this specification, for obvious modifications will occur to those skilled in the art to which the invention pertains.

What is claimed is:

1. An intrusion detection system comprising:
   a self-contained monitor energized by a primary power source responsive to an authorized remote controller transmitting a particular RF carrier signal under the control of a user;
   said self-contained monitor including a memory circuit for storing a code therein, an RF receiver circuit electrically coupled thereto and a motion detector positioned to surveil a predetermined space for an intruder;
   a plurality of switches included in said self-contained monitor electrically coupled to said memory circuit and accessible to said user for setting said code thereon representing said particular RF carrier signal;
   a code transfer circuit electrically coupled to said memory circuit and said plurality of switches and accessible to said user for transferring a last code set on said plurality of switches into said memory circuit; and
   said last code transferred into said memory circuit making said RF receiver circuit responsive to said particular RF carrier signal.

2. An intrusion detection system in accordance with claim 1 wherein said plurality of switches further comprises a plurality of two position switches.

3. An intrusion detection system in accordance with claim 2 wherein said code set on said plurality of two position switches defines a binary code representing said particular RF carrier signal.

4. An intrusion detection system in accordance with claim 1 wherein said code transfer circuit further comprises a pushbutton switch.

5. An intrusion detection system in accordance with claim 1 wherein said memory circuit further comprises a nonvolatile memory which does not lose said last code transferred therein when said primary power is disconnected from said self-contained monitor.

6. An intrusion detection system in accordance with claim 1 wherein said memory circuit further comprises a volatile memory circuit armed by said particular RF carrier signal and disarmed by a sensing of said intruder.

7. An intrusion detection system in accordance with claim 1 wherein said self-contained monitor further comprises a housing defining an access opening having a PCB mounted therein, said PCB mounting said plurality of switches thereon accessible to said user through said access opening.

8. An intrusion detection system in accordance with claim 7 wherein said code transfer circuit is mounted on said PCB accessible to said user.

9. An intrusion detection system in accordance with claim 1 wherein said user may subsequently change said last code set on said plurality of switches without effecting said last code transferred into said memory circuit so that said intruder, upon examination of said plurality of switches, cannot determine said last code making said self-contained monitor responsive to said authorized remote controller.

10. A receiver for use in a remotely controlled system comprising:
    an RF receiver circuit responsive to an authorized remote controller transmitting a particular RF carrier signal under the control of a user;
    a nonvolatile memory circuit;
    said RF receiver circuit being energized by a primary power source electrically coupled to said nonvolatile memory circuit;
    a digital switch included in said receiver electrically coupled to said nonvolatile memory circuit and accessible to said user for setting a binary code thereon representing said particular RF carrier signal;
    a code transfer circuit included in said receiver electrically coupled to said nonvolatile memory circuit and said digital switch and accessible to said user for transferring a last binary code set on said digital switch into said nonvolatile memory circuit; and
    said last binary code being secured in said nonvolatile memory circuit thereby making said RF receiver circuit responsive to said particular RF carrier signal.

11. A receiver in accordance with claim 10 wherein said digital switch comprises a plurality of two position switches.

12. A receiver in accordance with claim 11 wherein said plurality of two position switches comprises a DIP switch.

13. A receiver in accordance with claim 11 wherein said plurality of two position switches comprises a SIP switch.

14. A receiver in accordance with claim 10 wherein said code transfer circuit comprises a momentary pushbutton switch.

15. A receiver in accordance with claim 10 wherein said user can subsequently change said last code set on said digital switch without effecting said last code transferred into said nonvolatile memory.

16. A method for setting and inserting a code in a self-contained monitor of an intrusion detection system, said monitor being responsive to a particular RF carrier signal transmitted from an authorized remote controller, including the steps of:
    a) providing a digital switch in said self-contained monitor;
    b) providing a code transfer switch connected to said digital switch;
    c) providing a nonvolatile memory communicating with said transfer switch;
    d) selecting a binary code which represents said particular RF carrier signal;
    e) setting said binary code on said digital switch;
    f) activating said code transfer switch to transfer said code to said nonvolatile memory; and
    g) changing said binary code on said digital switch to prevent an intruder from detecting said code.

17. The method set forth in claim 16, including the additional step of activating said remote controller to test the insertion of said binary code.

* * * * *